May 16, 1939.  G. N. TOLSTED  2,158,917
HAY UNLOADER
Filed Sept. 22, 1938  2 Sheets-Sheet 1
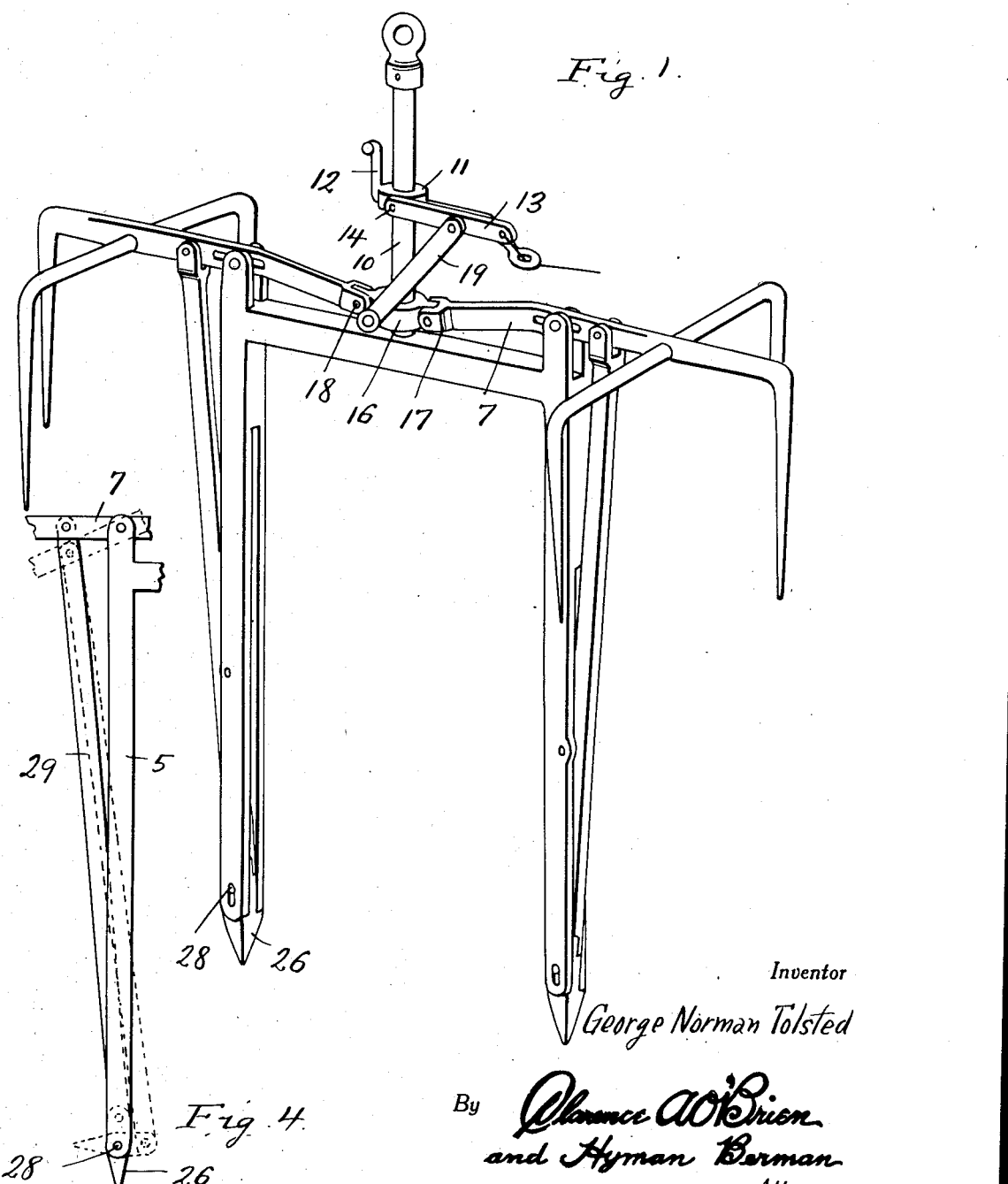
Inventor
George Norman Tolsted
By Clarence A. O'Brien
and Hyman Berman
Attorneys May 16, 1939.   G. N. TOLSTED   2,158,917
HAY UNLOADER
Filed Sept. 22, 1938   2 Sheets-Sheet 2
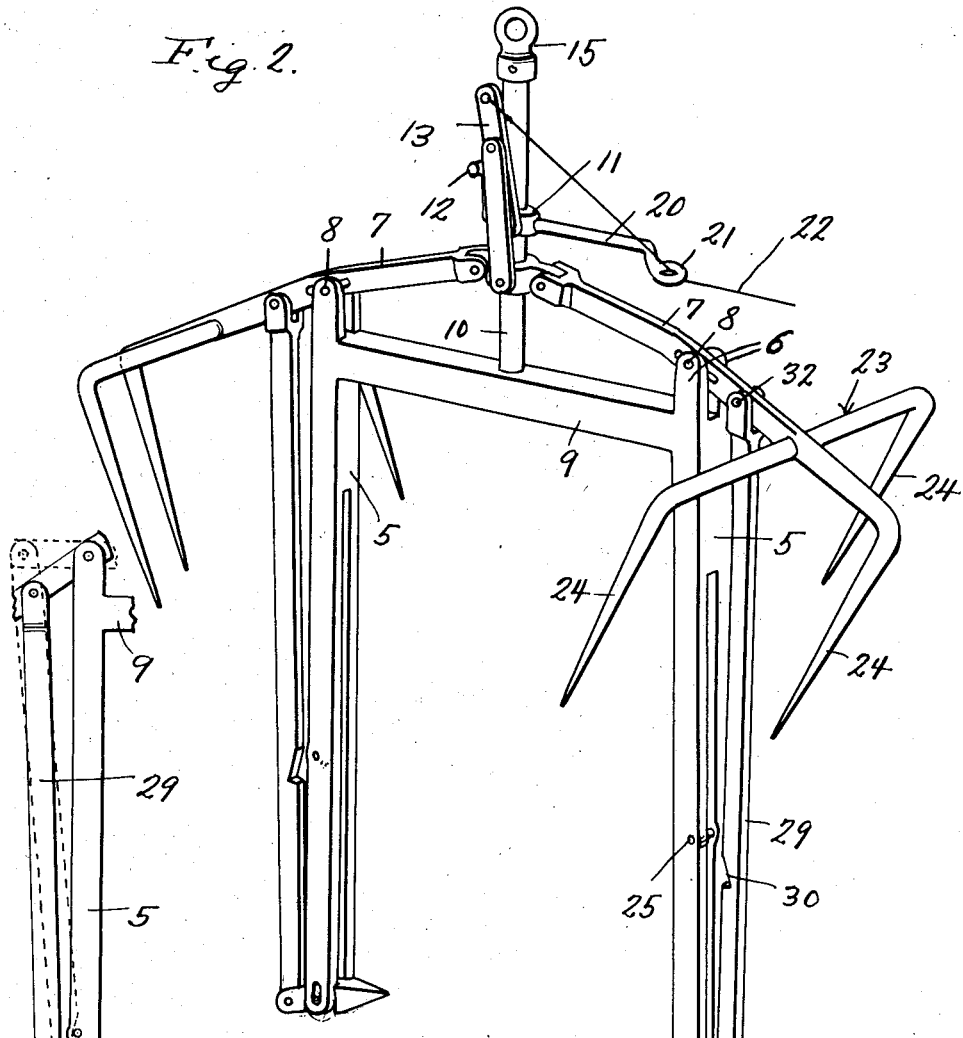
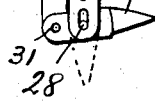

Patented May 16, 1939

2,158,917

UNITED STATES PATENT OFFICE 2,158,917

HAY UNLOADER

George N. Tolsted, Hales Corners, Wis.

Application September 22, 1938, Serial No. 231,271

1 Claim. (Cl. 294—128)

This invention appertains to new and useful improvements in hay handling means and more particularly to a grapple whereby hay can be elevated and properly deposited in barns and elsewhere.

The principal object of the present invention is to provide a hay handling device which will take a firm hold on the hay and retain the hay until it has reached a point where it is to be released, thus preventing the haphazard falling of hay where it is not wanted.

These and other objects and advantages of the invention will become apparent to the reader of the following specification.

In the drawings:

Figure 1 represents a perspective view of the implement in open position.

Figure 2 is a perspective view of the implement in closed or holding position.

Figure 3 is a side elevational view fragmentarily showing the mechanism as disclosed in Figure 2.

Figure 4 is a fragmentary side elevational view of the mechanism as shown in Figure 1.

Referring to the drawings wherein like numerals designate like parts, it can be seen that the implement consists of the vertical leg members 5—5 from the upper ends of which project the ears 6 between which the intermediate portions of the arms 7—7 are secured by pin and slot connections 8.

The legs 5—5 are connected at their upper end portions by the horizontal bar 9 from which rises the post 10. This post 10 has the fixed collar 11 thereon from which rises the stop 12 for the lever 13, this lever being pivotally secured as at 14 to the collar 11. The upper end of the post 10 is equipped with an eye 15 for the hoist line (not shown).

A slide collar 16 is provided on the lower portion of the post 10 and this has laterally disposed ears disposed into the bifurcated ends 17 of the arms 7 where they are pivotally secured together as at 18. A pivotal link member 19 connects the sliding collar 16 with the intermediate portion of the lever 13. An arm 20 extends laterally from the fixed collar 11 and has the guide eye 21 at its outer end and through this is disposed the pull line 22 which extends to the free end of the lever 13.

Each arm 7 carries the fork structure generally referred to by numeral 23 at its outer end, each fork consisting of the substantially parallel and downwardly disposed tines 24.

Each leg 5 is slotted from its lower end upwardly to a point adjacent its upper end and a cross pin 25 intersects the slot at its intermediate point.

A toe member 26 has its shank portion 27 reduced and disposed into the lower portion of the corresponding post 5 and there the shank is connected by the pin and slot connection 28 to the corresponding leg member 5. A connecting rod 29 has its intermediate portion notched as at 30 to accommodate the intermediate pin 25 on the leg 5, the lower end of this connecting rod being connected to the shank of the corresponding toe 26 as at 31 while its upper end is bifurcated to straddle the overlying arm 7 where it is pivotally connected as at 32.

It can now be seen that the grapple is lowered into the hay with the parts as shown in Figure 1 and as the grapple is lifted the parts assume the position as shown in Figures 2 and 3.

To release the hay, the pull line 22 is operated which lifts the forks 23 at the same time lowering the pointed toes 26 so that the hay can readily slide from the implement.

While the foregoing species sets forth the invention in specific terms, it is to be understood that numerous changes in the shape, size and materials may be resorted to without departing from the spirit and scope of the invention as claimed hereinafter.

Having described the invention, what is claimed as new is:

A hay grapple of the character described comprising a frame, a pair of pointed and swingable toe members at the lower portions of the frame, a pair of rockable arms at the upper portion of the frame, the outer end of each of the arms being provided with a fork, connecting means between the arms and the toes and means whereby the arms and toes can be operated simultaneously, said means including an upstanding post on the frame, a slide collar on the post to which the arms are pivotally secured, a lever mounted on the post, a link between the lever and the slide collar, and a pull line extending from the lever.

GEORGE N. TOLSTED.